United States Patent [19]

Chase et al.

[11] 4,385,259
[45] May 24, 1983

[54] DYNAMIC CONVERGENCE CONTROL APPARATUS FOR SHADOW MASK CRT DISPLAYS

[75] Inventors: Karl L. Chase, Glendale; Christopher R. Dusard; James M. Spencer, Jr., both of Phoenix, all of Ariz.

[73] Assignee: Sperry Corporation, New York, N.Y.

[21] Appl. No.: 258,991

[22] Filed: Dec. 24, 1980

[51] Int. Cl.³ .............................................. H01J 29/51
[52] U.S. Cl. ...................................... 315/368; 315/371
[58] Field of Search ................................ 315/368, 371

[56] References Cited

U.S. PATENT DOCUMENTS

| | | | |
|---|---|---|---|
| 3,517,252 | 6/1970 | Williams, Jr. | 315/371 |
| 3,825,796 | 7/1974 | Bello | 315/371 X |
| 3,943,279 | 3/1976 | Austefjord | 315/368 X |
| 3,961,223 | 6/1976 | Ray et al. | 315/371 |
| 3,996,611 | 12/1976 | Toone | 315/368 X |
| 4,095,137 | 6/1978 | Oswald | 315/368 X |
| 4,203,051 | 5/1980 | Hallett et al. | 315/368 X |
| 4,203,054 | 5/1980 | Sowter | 315/368 |
| 4,331,906 | 5/1982 | Fujino et al. | 315/368 |

*Primary Examiner*—Malcolm F. Hubler
*Attorney, Agent, or Firm*—Howard P. Terry

[57] ABSTRACT

An apparatus for providing precise convergence compensation in a shadow mask type color CRT display. Coarse compensation is provided by the coefficients of primary terms $x^2$, $y^2$ of the beam's longitudinal and vertical position polynomial in an analog format, and fine compensation is provided by digital programmable read-only-memories. The fine compensation is representative of the precise values of the coefficients of the remaining terms in these polynomials, and a digital-to-analog converter converts the fine compensation to an analog format. The coarse and fine data are summed together and applied to the convergence correction coils of the CRT.

8 Claims, 6 Drawing Figures

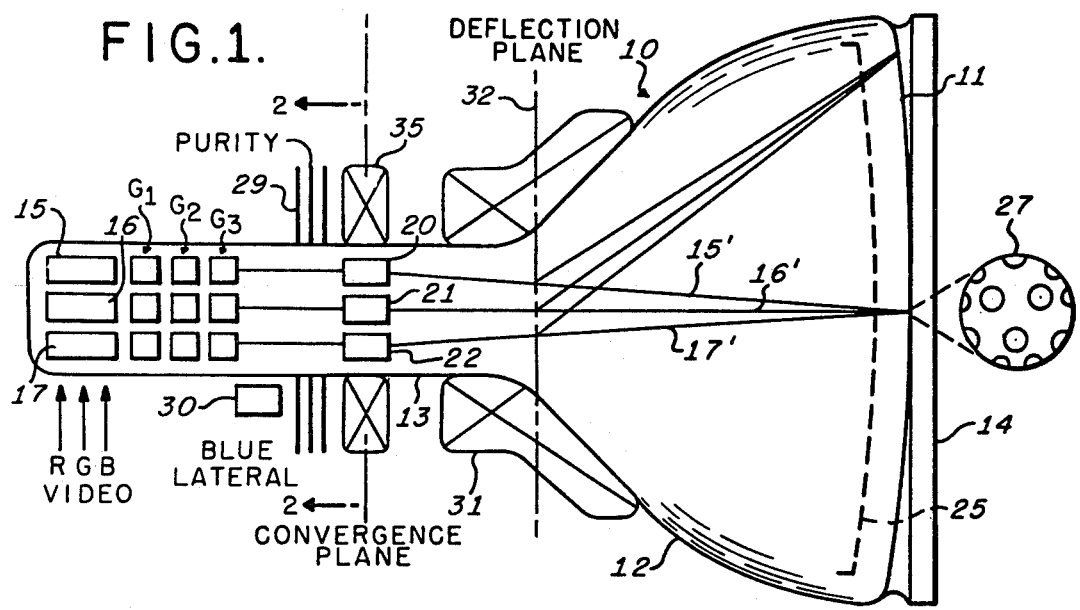
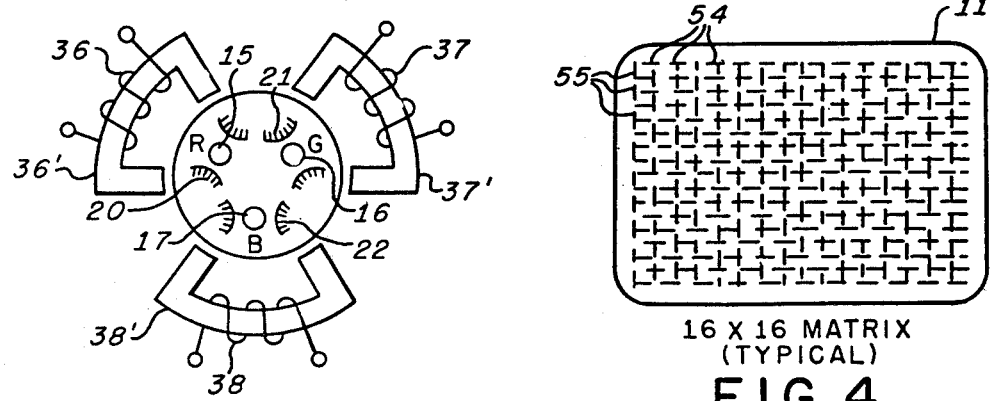
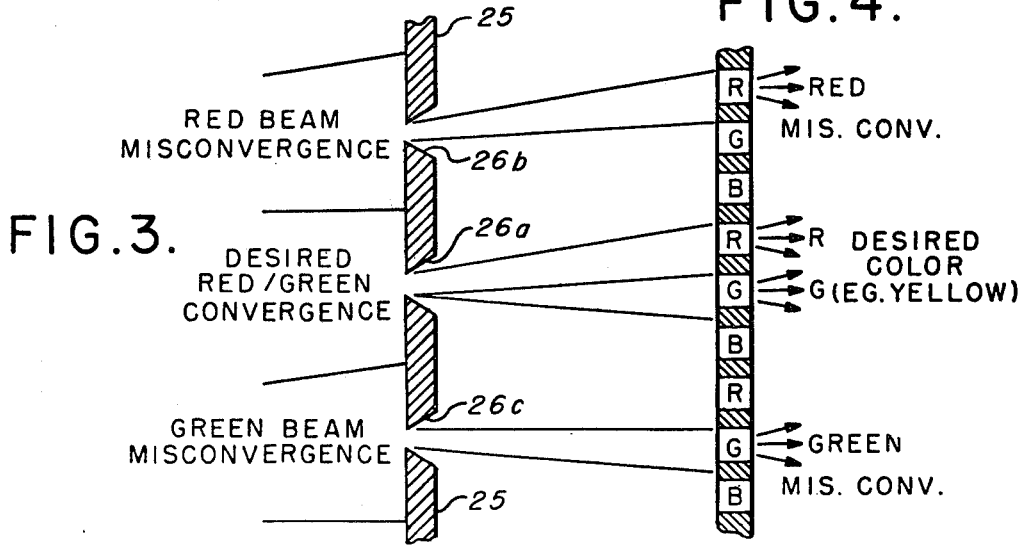

DYNAMIC CONVERGENCE CONTROL APPARATUS FOR SHADOW MASK CRT DISPLAYS

BACKGROUND OF THE INVENTION

1. Field of the Invention

The present invention relates generally to color cathode ray tube (CRT) display assemblies of the well known shadow mask type and more particularly to an improved dynamic beam convergence control apparatus for improving the color resolution of the displays generated thereon. Although not so limited, the present invention is particularly useful in color CRT flight instruments for aircraft for displaying control and navigation information to the pilot where the eye screen distance is relatively short, i.e., on the order of 26 to 30 inches. This information may be presented in raster format and/or stroke written format, the latter particularly being degraded if superior dynamic convergence control, such as provided by the present invention is not employed.

2. Description of the Prior Art

The problem of convergence control in shadow mask type color CRT displays has in the past been solved to an acceptable degree by many methods and techniques. As is well known to those skilled in the shadow mask CRT art, three separate very thin beams of electrons are generated, usually from three separate cathodes, which beams are normally focused on a screen or mask spaced from the interior surface of this CRT faceplate, which screen is comprised of myriads of pin-holes through which the beam triad passes and then diverges to energize corresponding dot triads of red, green, and blue phosphors resulting in red, green and blue light emissions from the face of the CRT. It is well understood that in the assembly of a shadow mask CRT, the faceplate and mask are a unique set; the black matrix and each phosphor dot is precisely located on the screen using a direct etch process. The phosphors contain photoresist material which is exposed through the mask by a light source which is directed by a suitable correction lens to pass through each mask hole in the same direction as its respective electron beam will pass in normal operation. Thus, pure colors are assured if the electrons in the beams traverse the same path as the photons of the lighthouse direct each beam. In a conventional delta gun configuration, the three electron guns, usually in an integrated assembly located at the end of the tube neck, are tilted towards each other at a precise angle such that their beams will converge at the center hole of the mask. However, it will be appreciated that manufacturing tolerances in the guns, the gun mounts, tube neck, and mask and faceplate geometrics will contribute to a non-convergence of the beams, i.e., all beams will all not pass through the same hole at all deflection angles. Furthermore, inherent non-uniformity in or non-linearity of the magnetic field generated by the beam deflection coils and the slightly diverse paths of each beam through those fields will also tend to produce misconvergence problems. The latter may be reduced at least to some extent by tailoring the deflection yoke coils to its particular CRT and then potting the two together. Nevertheless, in practice perfect or near perfect convergence may not be accomplished solely by mechanical means or deflection coil design. For example, misconvergence will inherently occur due to changing beam lengths as the beams are deflected towards the peripheral areas of the faceplate; the same familiar pincushion phenomenon. While this effect, which is approximately proportional to the square of the distance from the screen center, can be in major part electronically compensated by providing separate external beam convergence coils associated with gun pole pieces, such compensation is not usually completely uniform and varies from tube to tube so that the desired convergence or color resolution may not be achieved by this means only, further misconvergence compensation is required.

Some prior art schemes for minimizing the misconvergence problem have been developed, one of the most effective being arranging the electron guns in a linear array and shaping the deflection coil to provide inherent convergence control. While this technique has proved satisfactory for the commercial TV market, it is not appropriate for special applications such as aircraft cockpit instrumentation or other close-up observation CRTs because it suffers primarily from a small focus lens and incompatibility with larger neck CRTs which are desirable from a high performance display standpoint. Thus, a delta gun arrangement is desirable in that it provides a larger focus lens and therefore smaller, cleaner, brighter lines and a better overall aesthetic display, although dynamic convergence control is required. One prior art convergence compensation technique in delta gun CRT configurations involved, in addition to the basic parabolic $x^2$, $y^2$ compensation voltages applied to each of the three convergence coils representing the primary terms of the X and Y convergence compensation series exponential polynomials, the separate adjustment of a large plurality of potentiometers to supply the required fine compensation voltages to the coils adjacent to the gun triad. However, the potentiometers were used simply as curve shapers or gain changers for the $x^2$, $y^2$ signals for distorting the $x^2$, $y^2$ parabolic curve to simulate the effects of the minor polynomial terms. One potentiometer was required in each segment of the screen so that compensation was limited by space and weight considerations. Therefore such a technique is highly undesirable in airborne CRT displays because of the limited compensation provided and the resultant large volume, weight, reliability and cost penalties involved, together with cumbersome calibration procedures typically associated with interacting potentiometers.

SUMMARY OF THE INVENTION

The present invention provides a precision dynamic convergence compensation technique for a shadow mask type color CRT display which overcomes the problems associated with prior art techniques. Basically the compensation is based on an analog, coarse/digital fine technique wherein the coarse compensation is provided by the coefficients of primary terms $x^2$, $y^2$ of the beam's horizontal and vertical position polynomial in analog format and the fine compensation is provided by digital programmable read-only-memories (PROM) representing the precise values of the coefficients of the remaining terms of these polynomials. Each PROM is associated with each of the three beams, referred to as the red, green and blue beams, the contents of which provide predetermined precise shifts or discrete steps in the parabolic correction curve defined by the $x^2$, $y^2$ terms resulting in nearly perfect beam convergence over an essentially unlimited plurality of screen sectors depending upon the A/D word size and PROM capacity. The memories are addressed to read out this fine compensation data in accordance with the actual X and Y beam position commands. The fine compensation data is D/A converted and then added with the coarse analog compensation data, the resultant thereof being applied to the convergence correction coils thereby to provide precise convergence of the three beams at the plane of the mask or screen for all beams positions.

BRIEF DESCRIPTION OF THE DRAWINGS

The accompanying drawings illustrate a preferred embodiment of the present invention wherein:

FIG. 1 illustrates schematically a typical shadow mask type of color cathode ray tube;

FIG. 2 illustrates a cross section of the tube taken at line 2—2 of FIG. 1 and schematically showing the delta arranged beam guns and convergence compensation coils;

FIG. 3 illustrates on a greatly enlarged scale the effects of properly and improperly converged red and green beams;

FIG. 4 illustrates one preferred sector pattern used in carrying out the present invention.

DESCRIPTION OF THE PREFERRED EMBODIMENT

Figure 5A:
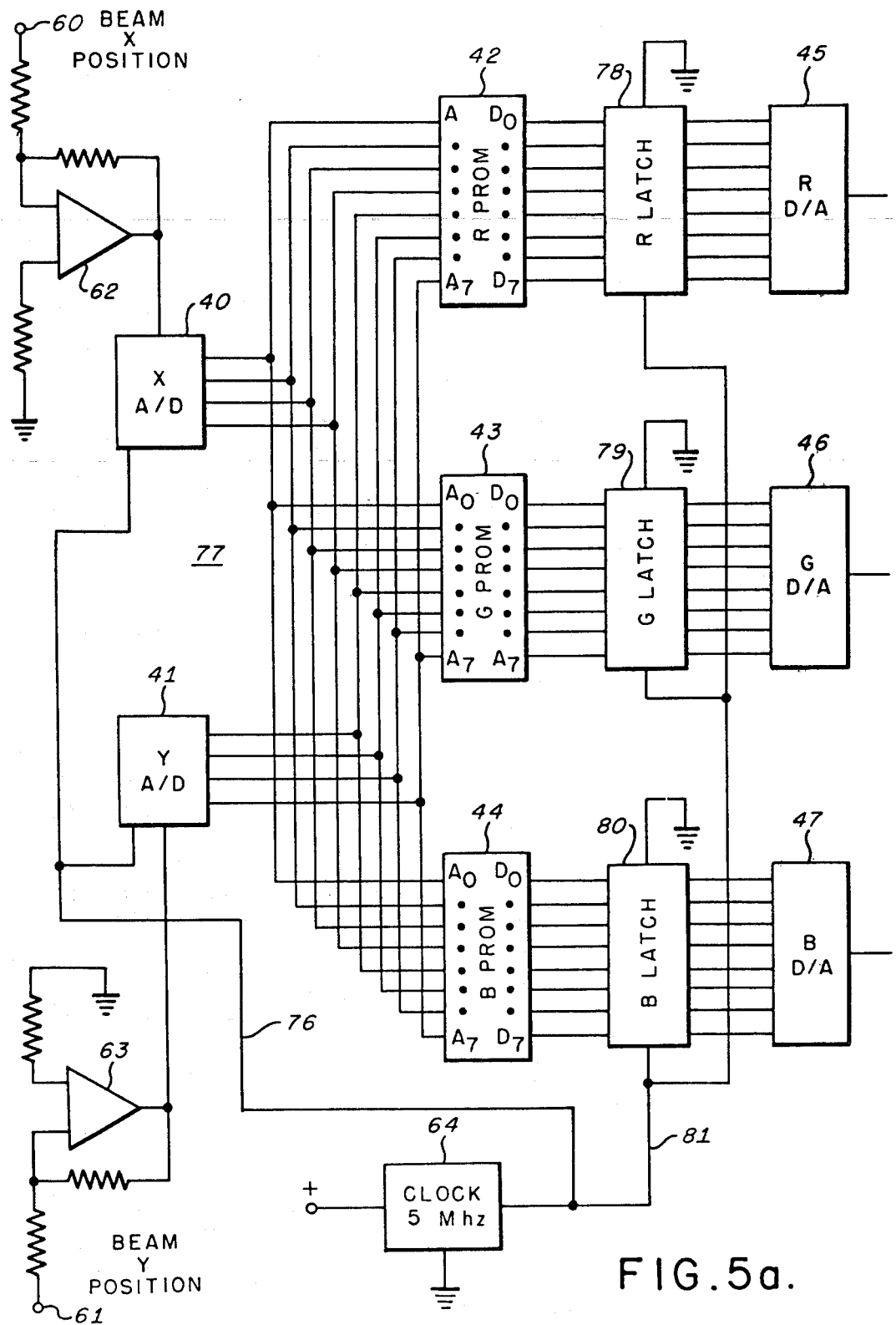
FIGS. 5a and 5b are a schematic electrical diagram of the convergence compensation apparatus of the present invention.

Referring now to FIG. 1, a schematic cross-section of a typical color CRT of the shadow mask type is illustrated. Conventionally, it comprises a glass envelope 10 including a faceplate 11, funnel 12 and cylindrical neck 13; a suitable preferably didymium glass bandpass filter 14 may also be provided for color and contrast enhancement. Internally of the envelope 10 are conventionally mounted three conventional color CRT electron guns 15, 16 and 17 which will be referred to herein as the red gun, green gun and blue gun respectively and the electron beams produced therefrom as the red beam 15', green beam 16' and blue beam 17'. Since the gun heaters and high voltage anode for imparting high electron velocities are conventional and well known essentials, they have not been shown. Also associated with the gun cathodes are conventional beam shaping grids or electrodes $G_1$, $G_2$, $G_3$ for accelerating and focusing the sharp, narrow electron beams 15', 16', and 17', and for focusing these beams nominally at the center of the screen or faceplate 11. A further set of internal pole pieces 20, 21 and 22 are also provided, the function of which will be described below. All of the foregoing gun-associated elements are usually contained in one mechanical assembly which are aligned within predetermined but finite tolerances and inserted into the tube neck 13 and the electrical connection thereto brought through glass-to-metal seals in the neck end. As stated above, a delta arrangement of the guns 15, 16 and 17 is preferred as illustrated schematically in FIG. 2 to provide a large focus lens and higher beam density and resultant smaller, cleaner, brighter display, especially with stroke written symbology. At the face end of the glass envelope 10 is the shadow mask 25. It is conventional and comprises a metallic plate having a myriad or matrix of small holes 26 (FIG. 3) and rigidly mounted in predetermined spaced relation to the internal faceplate surface. In the present embodiment, the holes are arranged in a pattern such that any three thereof are very close together and are 120° apart, the guns 15, 16, and 17 being preferably cooriented therewith. The rear or internal surface of the faceplate 11 is conventionally provided with a corresponding myriad or matrix of red, green and blue phosphor dots, three of which are illustrated schematically at 27 in FIG. 1, separated by a black or light absorbing material. The red, green and blue phosphor patterns are applied to the faceplate through the shadow-mask screen 25 in a conventional fashion using a photo resist and etch process so that the screen 25 and resulting faceplate 11 become a unique set. As schematically illustrated in FIG. 1, one or more of the electron guns 15, 16, 17 are effectively turned on by video signals 28 in accordance with the desired color to be displayed, the electron beams 15', 16', 17' pass through the shadow-mask and desirably through a single hole, emerge again and diverge to strike the corresponding phosphor dot or dots to reproduce the commander color. As will be discussed further below, if any portion of the beams pass through any adjacent screen hole, adjacent color dots will be energized resulting in a visible fringe about the desired color image corresponding to color of the mis-excited dot. This undesirable effect is referred to herein as misconvergence. Conventional purity adjustments 29 and blue lateral adjustment 30 are provided and their functions are well understood. Finally, the beams are deflected in accordance with horizontal and vertical deflection control signals by means of conventional deflection coils 31 having an effective deflection plane 32. These signals may provide raster displays or stroke written displays or a combination of both by conventional and well known CRT symbol generating techniques.

Although the manufacture of a color CRT of the shadow-mask type is carried out with extreme precision, finite manufacturing tolerances prohibit perfection. For example, slight misalignments between guns, gun mounts and tube neck dimensions relative to the shadow-mask/phosphor screen pair will contribute to mis-convergence of the beams. Also, since the three beams pass through different points in the deflection plane, each beam will tend to be deflected slightly differently; this in combination with inherent non-linearities of the deflection fields themselves will contribute to mis-convergence. While near perfect convergence may be achieved at the center area of the screen, substantial mis-convergence tends to build up as the beam is deflected towards the screen periphery. Also, while some mis-convergence may not be too objectionable in raster-type displays, it is very noticeable and unacceptable in stroke written symbols.

FIG. 3 schematically illustrates a typical mis-convergence of the red and green beams 15' and 16'. Desirably, both beams should be focused such that they intersect at the one screen hole 26a so that as they emerge from the hole they separate or diverge, the "red" beam energizing a red phosphor dot and the "green" beam energizing a green dot resulting in a yellow color to the observer's eye. However, due to misconvergence as shown in FIG. 3, the red and green beams do not precisely converge on the single hole 26a, the red beam being deflected more (or less) than the green beam so that a portion of it emerges from an adjacent hole 26b to thereby energize its corresponding red dot. The result will be that the desired "yellow" image will have a red fringe on one side of it. Similarly, if the green beam is deflected less (or more) than the red beam so that a portion of it emerges from an adjacent hole 26c, it will energize its corresponding green dot resulting in a green fringe on another side of the desired "yellow" image. The present invention overcomes this undesirable affect by providing superior convergence control of the three beams over the entire face of the CRT.

Figure 5B:
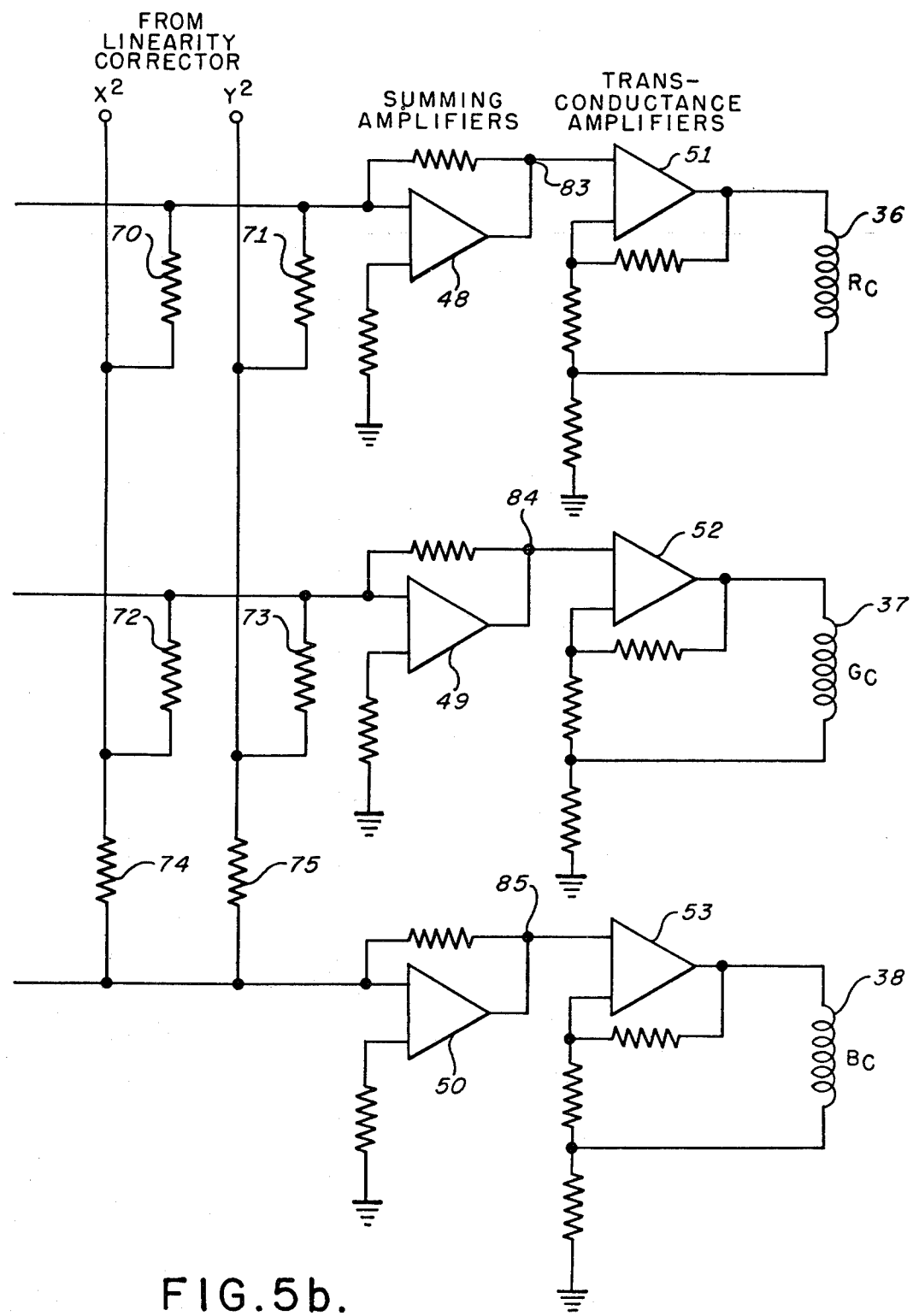

Basically, the dynamic convergence control apparatus of the present invention comprises combined analog/digital circuits illustrated schematically in FIG. 5, the outputs of which are precision currents which are supplied to convergence coils 35 mounted externally on the neck 13 of the CRT envelope 10 adjacent gun pole pieces 20, 21, and 22, as illustrated in FIGS. 1 and 2. The coils 35 comprise three separate coils 36, 37, 38 wound around suitably shaped core structure 36', 37' and 38' as illustrated in FIG. 2, which cooperates with magnetizable pole pieces 20, 21 and 22 associated with red, green and blue beam guns 15, 16 and 17. The currents in the coils 36–38 induce magnetic flux in their respective internal pole pieces 20–22 which in turn control the trajectories of the electrons of their respective beams 15'–17', independently of the deflection coil windings 31, in a manner such that all three of the beams converge at or are precisely focused on the shadow mask whereby all beams will pass through but a single hole of the mask at all commanded positions of the beam by the deflection coil currents.

Referring now to FIG. 5, the basic components of the hybrid convergence control apparatus of the present invention, that is a combined analog and digital convergence control apparatus, comprise: X and Y high speed analog-to-digital converters (A/D's) 40, 41, responsive respectively to the X or horizontal and Y or vertical positions of the beams commanded by conventional X and Y beam deflection amplifiers, not shown, for conventionally controlling the deflection coils 31, for encoding beam position; three convergence programmable read only memories (PROM's) 42, 43, and 44 for providing respectively fine red, green and blue convergence correction signals; three high speed digital-to-analog converters (D/A's) 45, 46, and 47 for providing fine analog red, green and blue correction signals; three summing amplifiers 48, 49 and 50 for summing the red, green and blue fine correction signals with the coarse correction signals derived from beam position signals supplied by conventional horizontal and vertical beam deflection amplifiers; and three transconductance amplifiers 51, 52 and 53 for converting the final convergence correction voltage signals to corresponding precision currents for energizing the red, green and blue conversion correction coils 36–38 respectively.

More specifically, X and Y beam position data in analog format is received at input terminals 60 and 61 respectively from the beam position commanded by a conventional symbol generator, for example, the beam position commanded by the horizontal and vertical sawtooth outputs of a conventional raster generator and before being corrected by the linearity corrector which shapes the deflection currents for CRT geometries. One suitable deflection amplifier is illustrated in Applicants' assignee's copending U.S. application Ser. No. 135,372, filed Mar. 31, 1980 in the name of T. Spilsbury entitled "Deflection Amplifier System for Raster Scanned Cathode Ray Tube Displays". The normally bipolar X and Y position signals are converted to unipolar signals and buffered by amplifiers 62 and 63 and applied to the input terminals of conventional high speed, synchronous A/D converters 40 and 41 which are driven by a suitable clock 64 operating at, for example, 5 MHz. Each of these converters is the same and encodes its analog input voltage to a corresponding four bit digital word. Thus the 4-bit parallel digital output of X position A/D 40 effectively divides the CRT face into sixteen discrete vertical columns 54 while the 4-bit parallel digital output of Y position A/D 41 effectively divides the CRT face into sixteen discrete horizontal rows 55. When these outputs are combined they define a 16×16 matrix dividing the tube face 11 into 256 discrete sectors. This sector matrix is illustrated in FIG. 4. Obviously, different numbers of sectors may be employed. This sector position data is applied to convergence correction PROM's 42, 43, and 44 which are pre-programmed in accordance with fine digital convergence correction data for each of the 256 screen sectors. Since the correction is all electronic, the number of sectors is limited only by the A/D word size and capacity of the PROM and the degree of perfection desired.

During calibration of the completely assembled CRT, all three of the beams are turned on and adjusted to form a predetermined pattern, for example a spot or short line, which is then deflected by applying predetermined signals to the deflection coil 35 to position the spot at each of the sectors of the screen. The coarse convergence correction signals $x^2$ and $y^2$, derived from the outputs of the linearity corrector of the horizontal and vertical deflection amplifiers, are applied to the convergence correction coils 36–38 at each matrix sector for providing gross convergence compensation inherent in the tube's geometrics and deflection coil characteristics. Of course if the convergence at a particular screen sector is perfect or satisfactory for the application, the displayed pattern will be white. If there is any misconvergence, the displayed white pattern will include a fringe of red and/or green and/or blue depending upon the magnitude and direction of the misconvergence. In one technique, this misconvergence is corrected at each X and Y matrix sector by supplying additional currents to each of the red, green and blue correction coils 36–38 until the respective color fringe is removed, or reduced to the acceptable amount for the application, and the value of this required current precisely determined. Each of these currents is then conventionally digitized and used to program the red, green and blue PROM's 42, 43, 44 such that for each X and Y matrix position of the beams 15', 16', 17', three 8 bit digital numbers corresponding to the required red, green and blue fine correction currents are supplied from the PROM's.

Another technique may be employed to establish the digital outputs of the PROMs. Instead of establishing correction currents for each of the 256 cells of the X—Y matrix, a fewer number of cells may be excited and examined and the remaining currents determined by extrapolation. Those skilled in this art may readily develop a computer program to accomplish this.

A further technique may be employed which is applicable in those instances where a tube and its associated deflection coils are supplied as a precalibrated unitary assembly from a manufacturer. In such a case, the manufacturer will supply a set of recommended convergence waveforms which he has established for the particular unit. In general, these wave forms are plots of required convergence correction current vs. horizontal and vertical beam position. There is, of course, a set for each color component and each set includes not only the primary $x^2$, $y^2$ parabolic components but also lower and higher order components; for example, first and third asymmetric components and fourth symmetric components. A typical convergence correction current fourth-order power series for the horizontal green component may be expressed typically as follows:

$$I_{cg}=I_1 gx+I_2 gx^2+I_3 gx^3+I_4 gx^4$$

In practice, the coefficients of the x terms are determined by either of the former techniques or other conventional techniques and these values are used to plot the four corresponding correction current vs. x beam position curves. The primary or $x^2$ current components established by the curves are used to shape the $x^2$ voltages from the linearity corrector of the horizontal deflection amplifier on a "best fit" basis, such as by selection of resistors 70, 71 and 72, 73 and 74, 75 of FIG. 5. The first, third and fourth order coefficients are used to determine the resultant fine correction currents which currents are in turn digitized and used to conventionally establish the X position contents of the green PROM. The same procedure is used to establish the Y position contents of the green PROM and the X and Y position contents of the red and blue PROMS.

Having programmed the PROMS 42, 43 and 44 by using any of the above or other techniques, their contents now include a plurality of digital words, in the present embodiment 256, corresponding to the red, green and blue convergence currents required for fine convergence correction for each X and Y matrix position of the beams. It remains therefore to address these PROMS and output their contents as a function of commanded beam position for combining or adding with the primary $x^2$, $y^2$ signals from the linearity corrector of the deflection amplifier.

Accordingly, the clock 64, via lead 76, synchronously clocks out the four-bit digital words from the X and Y A/Ds to address the PROMS 42, 43 and 44 through parallel network 77. Their respective outputs, corresponding to the fine conversion correction currents for the commanded matrix cell, are latched into conventional latches 78, 79, 80. It will be noted that the data is unlatched therefrom into A/D converters 45, 46 and 47 synchronously with the A/Ds via clock lead 81. This synchronous conversion and latching operation results in jitter-free correction signals. Thus, each D/A 45, 46 and 47 supplies an output current proportional to the fine red, green and blue convergence correction required for the matrix cell at which the beam is positioned. This fine output data is summed with the coarse $x^2$ and $y^2$ beam position currents developed across the resistors 70–75, which are selected to provide as near optimum as possible curve fit to the three horizontal and three vertical characteristic parabolas described above. It will be noted, however, that in effect, the PROM-derived fine currents serve to incrementally shift the approximate $x^2$, $y^2$ parabolic curves to their precise shape for each beam position; that is, to include the precise values of the other terms of the convergence correction power series discussed above, rather than to simulate these values by the potentiometric shaping networks of the prior art.

The red, green and blue summed coarse and fine currents are applied to their summing amplifiers 48, 49 and 50 to develop precise corresponding voltages at their outputs 83, 84 and 85 respectively. These voltages are converted to corresponding precision currents via transconductance amplifiers 51, 52 and 53 and applied directly to the red, green and blue convergence coils 36, 37 and 38. As stated above, these coil currents through their iron cores induce magnetic flux across the pole pieces 20, 21 and 22 of the red, green and blue cathode structures to alter their beam trajectories in directions to cause them to converge precisely at the surface of the mask screen for all beam angle positions. Experience has established such improved convergence to be within 0.05 millimeters at any beam position.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. In a color cathode tube display system including a cathode ray tube of the type including a generally planar viewing screen and cooperative shadow mask having predetermined horizontal and vertical dimensions and a plurality of cathodes producing a plurality of cathode beams adapted to be controlled so as to converge on a single one of a myriad of holes of said shadow mask at substantially all horizontal and vertical positions of said beams produced by beam position command signals and by beam deflection signals supplied to the deflection coils of said cathode ray tube, said cathode ray tube further including convergence coils associated with each of said cathodes for individually positioning each of said beams independently of said deflection coils, hybrid convergence control apparatus for said system comprising:

first means responsive to said beam deflection signals for producing a plurality of analog substantially continuous coarse convergence correction signals each corresponding to first parabolic components of $x^2$ and $y^2$ predetermined functions of the horizontal and vertical components of beam position X and Y produced by said deflection signals;

second means responsive to said beam position command signals for producing a plurality of digital fine convergence correction signals each corresponding to at least second components of said predetermined functions of the horizontal and vertical components of beam position produced by said position command signals, said second means comprising digital encoding means responsive to the horizontal and vertical beam position command signals for providing a plurality of digital word signals defining a corresponding plurality of sectors of said viewing screen and shadow mask, and memory means for each plurality of beams, responsive to said digital word signals for providing said plurality of digital fine convergence correction signals; and third means responsive to said analog and digital convergence signals for supplying currents to said convergence coils proportional to the sum thereof.

2. The hybrid convergence control apparatus as set forth in claim 1 wherein second means includes memory means comprised of programmable read only memory means and said digital encoding means comprises horizontal and vertical analog-to-digital converter means responsive to said horizontal and vertical beam position command signals and said second means further includes latch means for receiving the outputs of said memory means.

3. The hybrid convergence control apparatus as set forth in claim 2 wherein said analog-to-digital converter means comprises synchronous analog-to-digital converter means and said second means further includes
- clock means for supplying a pulse train of a predetermined frequency, and
- means responsive to said clock means for synchronously controlling said analog-to-digital converter means and said latch means.

4. The hybrid convergence control apparatus as set forth in claim 3 wherein said third means incudes digital-to-analog converter means responsive to said latch means.

5. The hybrid convergence control apparatus as set forth in claim 1, wherein said first means produces a plurality of coarse convergence correction signals substantially continuous between adjacent sectors of said plurality of sectors.

6. The hybrid convergence control apparatus as set forth in claim 1, wherein said second components comprise at least a direct currect correction for X and Y.

7. The hybrid convergence control apparatus as set forth in claim 6, wherein said second components further comprise $x^3$ and $y^3$ terms.

8. The hybrid convergence control apparatus as set forth in claim 7, wherein said second components further comprise $x^4$ and $y^4$ terms.

* * * * *